United States Patent [19]
Natsume et al.

[11] Patent Number: 5,927,848
[45] Date of Patent: Jul. 27, 1999

[54] VEHICULAR LAMP AND LAMP BODY THEREFOR

[75] Inventors: Kazunori Natsume; Susumu Kaneko; Hiroshi Kawashima; Hideaki Satsukawa, all of Shizuoka, Japan

[73] Assignee: Koito Manufacturing Co., Ltd., Tokyo, Japan

[21] Appl. No.: 08/708,973

[22] Filed: Sep. 6, 1996

[30] Foreign Application Priority Data

Sep. 14, 1995 [JP] Japan .................................. 7-262458

[51] Int. Cl.⁶ .................................................. B60Q 1/00
[52] U.S. Cl. ........................ 362/496; 362/217; 362/328; 362/336
[58] Field of Search .............................. 362/80, 217, 61, 362/328, 261, 310, 309, 80.1, 336, 339, 340

[56] References Cited

U.S. PATENT DOCUMENTS

| | | |
|---|---|---|
| 1,335,330 | 3/1920 | Goings ....................... 362/328 |
| 1,347,394 | 7/1920 | Martin ....................... 362/328 |
| 1,655,399 | 1/1928 | Wagner ....................... 362/217 |
| 4,523,262 | 6/1985 | Shinkai ....................... 362/80 |
| 4,652,979 | 3/1987 | Arima ....................... 362/80 |
| 4,722,023 | 1/1988 | Arima et al. ............... 362/80 |
| 4,740,871 | 4/1988 | Dilouya ....................... 362/336 |
| 4,760,501 | 7/1988 | de Vrijer .................... 362/80 |
| 4,893,220 | 1/1990 | Kakidaira .................. 362/80.1 |
| 4,945,456 | 7/1990 | Kakidaira .................. 362/80.1 |
| 5,083,245 | 1/1992 | Fray et al. .................. 362/328 |

*Primary Examiner*—James C. Yeung
*Attorney, Agent, or Firm*—Morgan, Lewis & Bockius LLP

[57] ABSTRACT

A vehicular lamp includes: a light source emitting a light; a lens having a small size in width; a reflector for reflecting the light emitting from the light source toward the lens, wherein the reflector has a large size in width relative to the lens to focus the light emitting from the light source within the lens width, an optical axis between the light source and the reflector is inclined with respect to the lens, and the lens has steps for refracting the light runs along the optical axis.

24 Claims, 9 Drawing Sheets

VEHICULAR LAMP AND LAMP BODY THEREFOR

BACKGROUND OF THE INVENTION

The present invention relates to a vehicular lamp, such as so call a high mount stop lamp (HMSL, when applicable), in which a lens surface serving as a light emitting face is designated to be small in the vertical direction. More specifically, the invention relates to a vehicular lamp in which high brightness at a light emitting face can be accomplished.

Recently, an HMSL is formed such that a lens surface serving as a light emitting face is short in height dimension. This shape is desired not only by the design viewpoint of the automobile, but also the demand that a rear visual field of the driver is not interrupted as possible when the HMSL is mounted on the rear portion of the automobile. In the HMSL, therefore, both a lamp body and a lens attached to a front opening of the lamp body are short in height dimension, and they form a lamp chamber, and a bulb serving as a light source is accommodated in the lamp chamber thus constructed.

Since the lamp body must be short in height dimension due to the reduced height of the lens, a reflector which is provided at a rear portion of the lamp body must be also designed small in height dimension. Therefore, the light intensity of a part of light, which emits from the bulb reflected by the reflector and passes through the lens and is finally available to actual illumination, must be suppressed. In other words, a solid angle for the light emitting from the light source is restricted by the reflector, and thereby the effective intensity of light is reduced. Accordingly, the amount of light which passes through the lens is lowered, and it is difficult to obtain the desired brightness at the lens.

Figure 11:
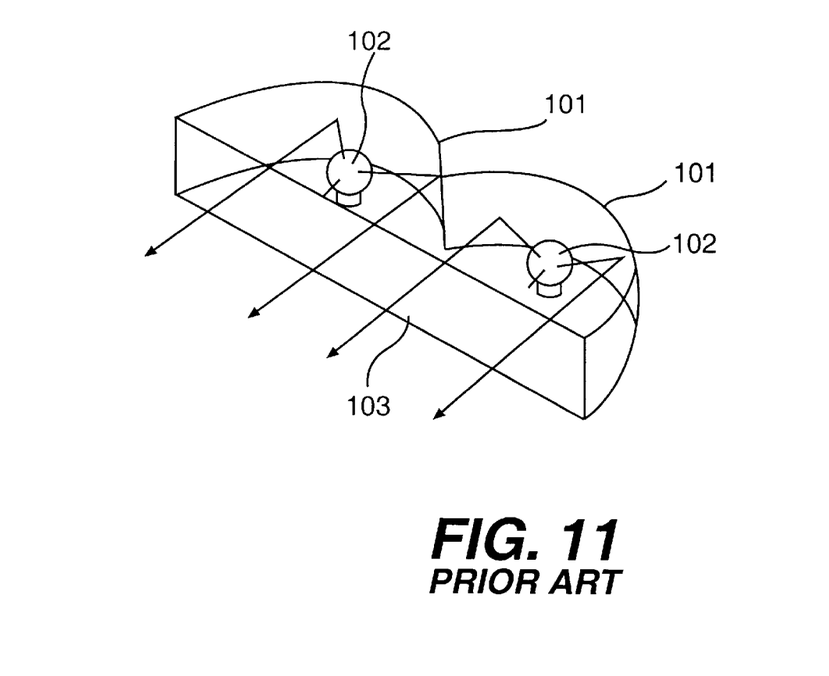
FIG. 11 is a perspective view showing a conventional lamp.

In view of the foregoing difficulties, as shown in FIG. 11 for example, it is proposed that plural reflectors 101 and bulbs 102 are laterally arrayed for a lamp and it makes the amount of the light emitting from the bulbs increase so that the total light amount passing through a lens 103 having a reduced width can increase, that is, the brightness at the lens of the lamp can be improved. On the other hand, however, the proposed arrangement of these plural reflectors and bulbs is still disadvantageous in that the lamp size becomes larger and the lamp consumes more electric power.

SUMMARY OF THE INVENTION

It is an object of the invention to provide a small width vehicular lamp in which improves the brightness at the lens without requiring additional bulbs.

The prevent invention provides a vehicular lamp including: a light source emitting a light; a lens having a small size in width; a reflector for reflecting the light emitting from the light source toward the lens, wherein the reflector has a large size in width relative to the lens to focus the light emitting from the light source within the lens width, an optical axis extending between the light source and the reflector is inclined with respect to the lens, and the lens has steps for refracting the light runs along the optical axis.

DETAILED DESCRIPTION OF THE PREFERRED EMBODIMENTS

Embodiments of the present invention will be now described in detail with reference to accompanying drawings.

Figure 1:
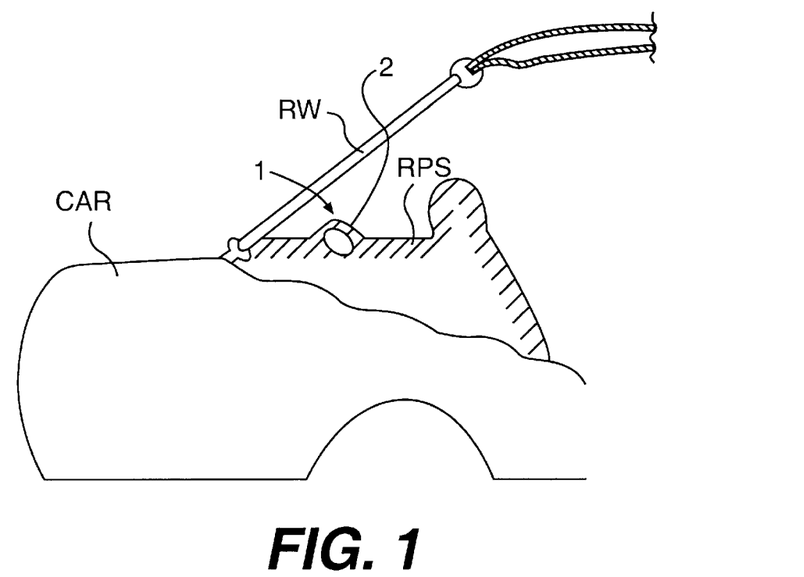
FIG. 1 shows an outline of a rear portion of an automobile in which a high-mount-stop-lamp of a first embodiment of the present invention is applied.
Figure 2:
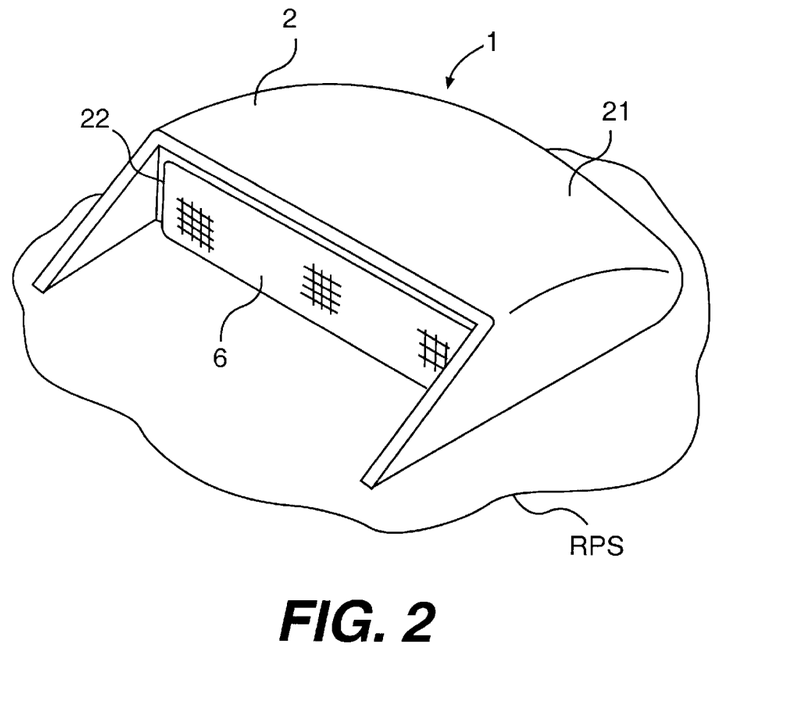
FIG. 2 is a perspective view showing an external appearance of the high-mount-stop-lamp of the first embodiment.
Figure 3:
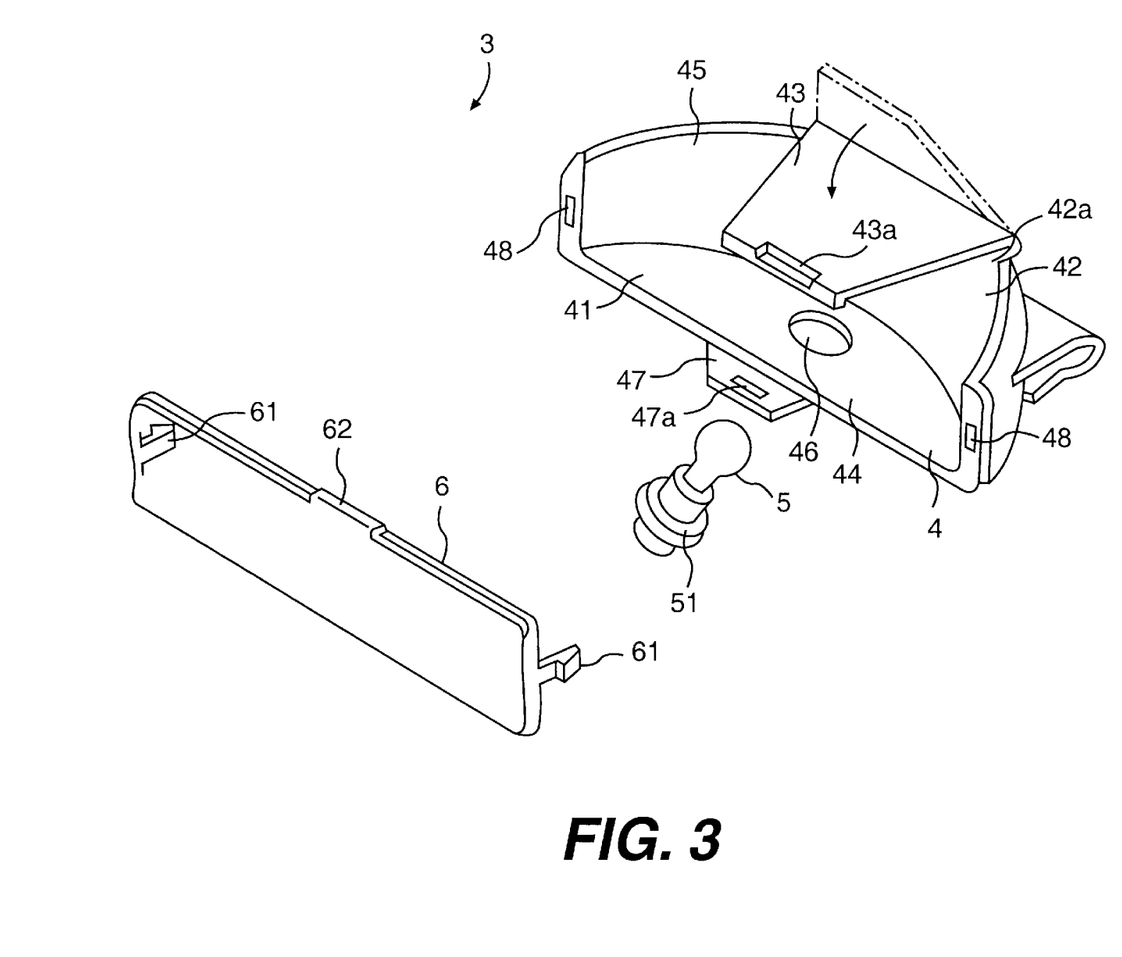
FIG. 3 is a partial exploded view of the high-mount-stop-lamp of the first embodiment.

FIG. 1 shows a rear portion of an automobile. As shown in FIG. 1, a high-mount-stop-lamp (HMSL) 1 is mounted at a rear parcel shelf RPS formed at the rear portion of the room of the automobile CAR. The HMSL 1 confronts a rear window RW, and emits light backward through the rear window RW of the automobile. FIG. 2 is a perspective view showing an external appearance of the HMSL 1 and FIG. 3 is a partially exploded view of the HMSL 1.

The HMSL 1 comprises a casing 2 which is formed on the upper portion of the rear parcel shelf RPS and a lamp unit 3 which is accommodated in the casing 2. The lamp unit 3 comprises a lamp body 4 having a container shape being laterally long, a bulb 5 being mounted in the lamp body 4, and a lens 6 being attached to the front opening of the lamp body 4.

Figure 4:
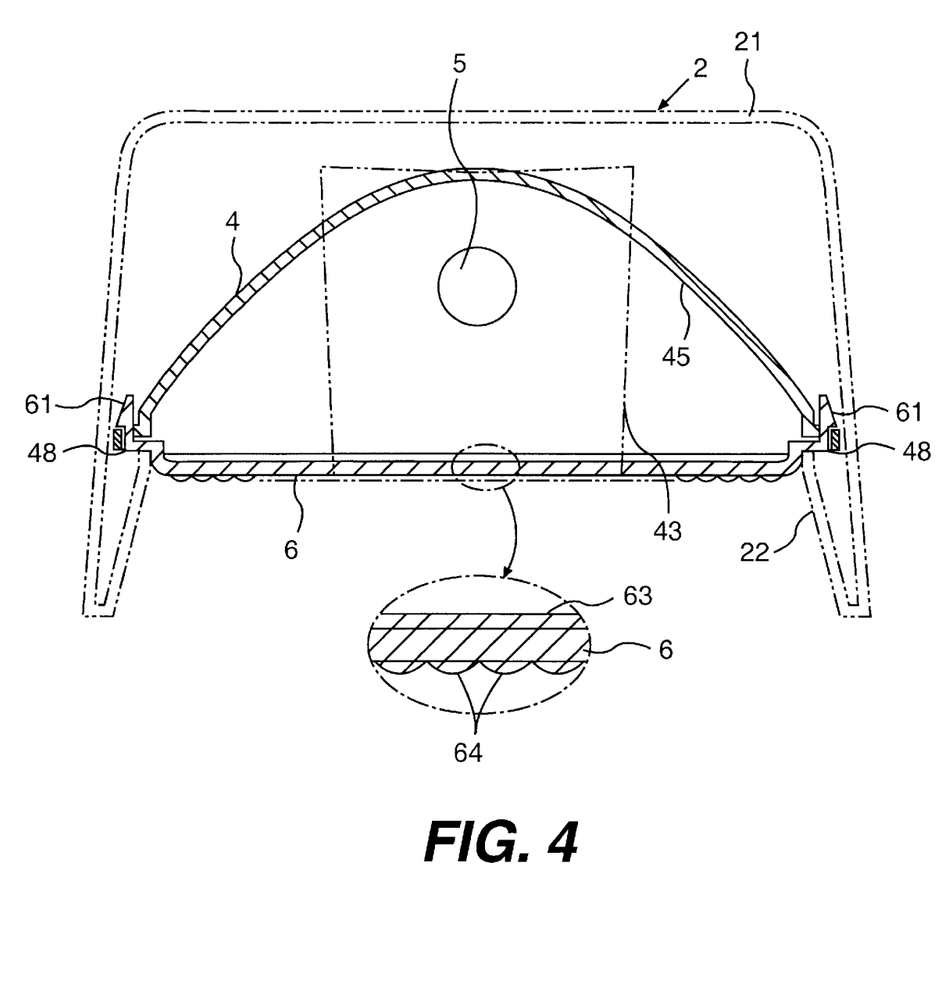
FIG. 4 is a cross sectional view showing the high-mount-stop-lamp cut out in the horizontal direction.
Figure 5:
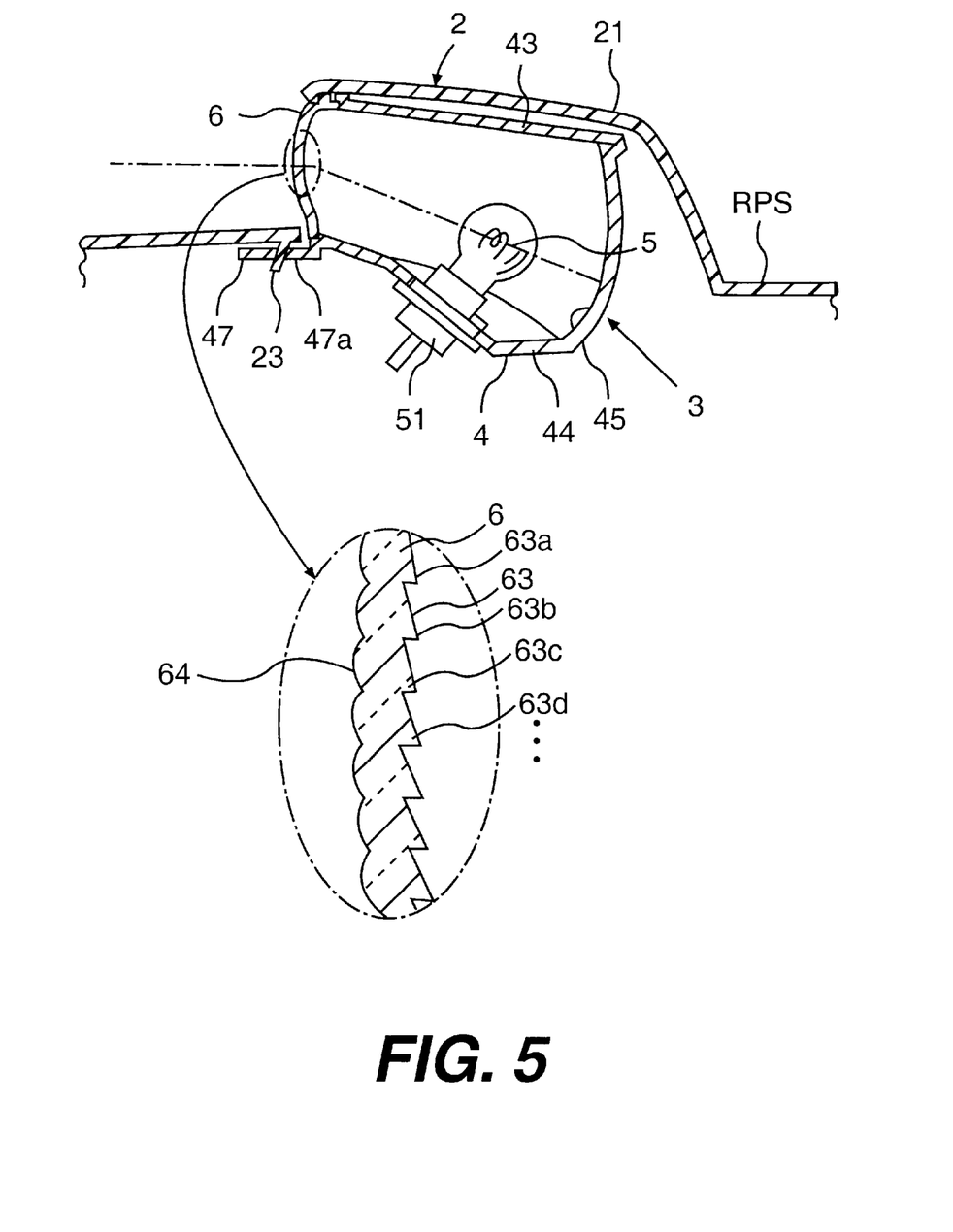
FIG. 5 is a cross sectional view showing the high-mount-stop-lamp cut out in the vertical direction.

FIGS. 4 and 5 are cross sectional views showing the HMSL 1 in the horizontal and vertical directions, respectively. As illustrated in FIGS. 4 and 5, the lamp body 4 has a vessel-like shape with a horizontal length larger than a vertical length. That is, the lamp body 4 is laterally elongated so that a front opening 41 of the lamp body 4 has a size equal to the desired height of the HMSL. The height of the lamp body 4 is designed to be gradually enlarged from the front opening 41 toward its rear. In other words, the height of the lamp body 4 at the rear portion 42 is larger than at the front opening 41.

In this embodiment, in order to avoid protruding the top portion of the HMSL 1 from the upper surface of the rear parcel self as possible when the lamp unit 3 is mounted into the casing 2, the top portion 43 of the lamp body 4 is substantially flat in horizontal direction and a bottom portion 44 has a down slope toward the rear side.

An inner surface of the rear portion 42 of the lamp body 4, which is subjected to an aluminum coating treatment or the like, serves as a reflector 45. The reflector 45 has a parabolic surface in horizontal direction and a light-focusing surface having a circular shape, an elliptic shape or the like in vertical direction. In this embodiment, an optical axis on the center line of the reflector 45 is inclined downward from the front opening 41 toward the rear portion 42 so that the optical axis runs at the middle between the top portion 43 and the bottom portion 44 of the lamp body 4.

A bulb inserting hole 46 in which the bulb 5 is mounted is formed in the bottom portion 44 of the lamp body 4. A protrusion 47 having a locking groove 47*a* for receiving a hook 23 of the casing 2 (described later) is formed at the middle front of the bottom portion 44. A couple of slits 48 engageable with respective protrusions of the lens 6 (described later) are formed at both side end portions near the front opening 41 of the lamp body 4.

In the present embodiment, in order to attain easy operation during the molding of the lamp body 4, the top portion 43 is inclined upwardly during the molding, that is, the top portion 43 is molded parallel to the bottom portion 44 so as for a mold die to easily remove therefrom. After molding, the top portion 43 is bent at a hinge 42*a* provided between the rear portion 42 and the top portion 43. A locking portion 43*a* is formed at a front edge of the top portion 43, and the top portion 43 keeps its folding state because the locking portion 43*a* is locked to the locking portion 62 formed on an upper edge of the lens 6 when the lens 6 is secured to the lamp body 4 (described in detail later).

The bulb 5, which is an incandescent bulb for instance in this embodiment, is accommodated in the lamp body 4 and supported by a bulb socket 51 engaging with the bulb insertion hole 46 formed in the bottom portion 44 of the lamp body 4. In this case, a filament serving as a point light source of the bulb 5 is positioned at a focus of the reflector 45 in horizontal direction. In other words, the filament is positioned on the optical axis of the reflector 45 and focuses of the parabolic and light-focusing surfaces. Since the optical axis inclines downwardly toward the rear potion, the focus of the reflector 45, that is, the filament of the bulb 5 is positioned lower than a center of the lens 6.

The lens 6, which is formed from a transparent resin, has a laterally elongated rectangular shape so as to correspond to the size of the front opening 41 of the lamp body 4. Protrusions 61 are formed at both ends of the lens 6, and project inwardly serving as lances. The lances 61 are inserted into the respective slits 48 formed on the both side portions near the front opening 41 of the lamp body 4, and locked therewith so that the lens 6 is fixed to the lamp body 4. In the case where the lens 6 is fixed to the lamp body 4 and the top portion 43 of the lamp body 4 is bent forwardly, the locking portion 43*a* formed on the front edge of the top portion 43 engages with the locking portion 62 formed on the upper edge of the lens 6, so that the top portion 43 keeps its folding state by the lens 6.

As enlargedly shown in FIGS. 4 and 5, plural refraction steps 63 (63*a*, 63*b*, 63*c*, . . . ), each having a triangular shape in cross section and extending in horizontal direction, are arrayed in height direction. Inclined surfaces of the refraction steps 63 face up so as to refract the direct light beam from the bulb 5 and the reflected light beam from the reflector 45, so that the direct and reflected light beams emit substantially in the horizontal direction.

In this embodiment, the lens 6 is inclined with respect to the optical axis of the reflector 45. Accordingly, the lower refraction step 63 has the larger angle inclined surface so as to refract the light substantially in the horizontal direction. The inclination angles sequentially increase for the refraction steps 63*a*<63*b*<63*c*<63*d* . . . Fisheye steps 64, each having a projection lens shape, are arranged like a checker board. The pitch of the fisheye steps is equal to that of the refraction steps, and each fisheye step confronts to the respective refraction step. Alternatively, the pitch of the fisheye steps may be integer times as large as the refraction steps.

The lamp unit 3 thus constructed is mounted in the casing 2 formed at the upper surface portion of the rear parcel shelf RPS of the automobile, and fixedly supported by a car body panel. As shown in FIG. 2, the casing 2 has a hood portion 21 which is in form of a U-shape obtained by the rear parcel shelf RPS upwardly projected in part, and a laterally elongated opening 22 is formed at the automobile rear side of the hood portion 21. The lens 6 of the lamp unit 3 is positioned at the opening 22 of the hood portion 21. A hook 23 downwardly protruding under the front edge of the opening 22 is integrally formed and engages with the locking groove 47*a* formed in the protrusion 47 of the lamp body 4. When mounting, the lens 6 of the lamp unit 3 is positioned higher than the upper surface of the rear parcel shelf RPS, on the contrary, the lamp body 4 and the bulb 5 is lower than the rear parcel shelf RPS.

Figure 6A:
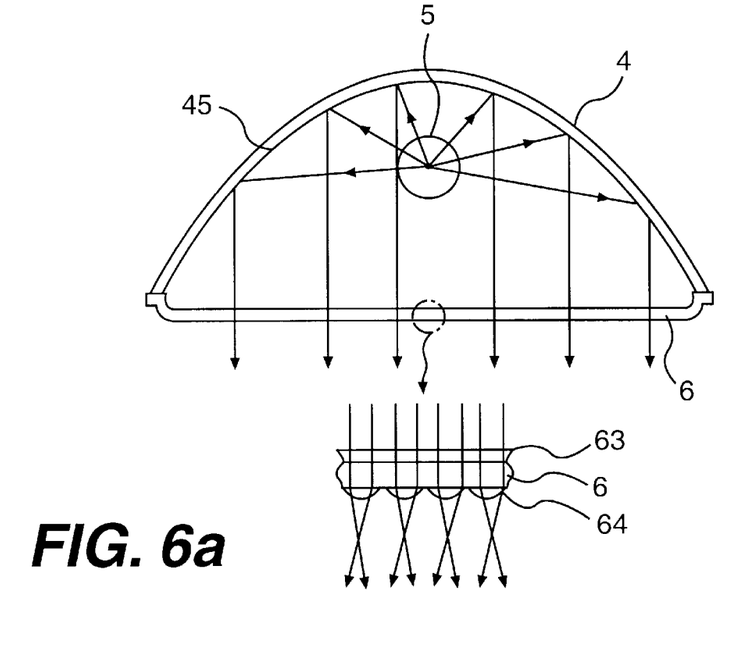
FIGS. 6A and 6B show light loci in the high-mount-stop-lamp of the first embodiment.
Figure 6B:
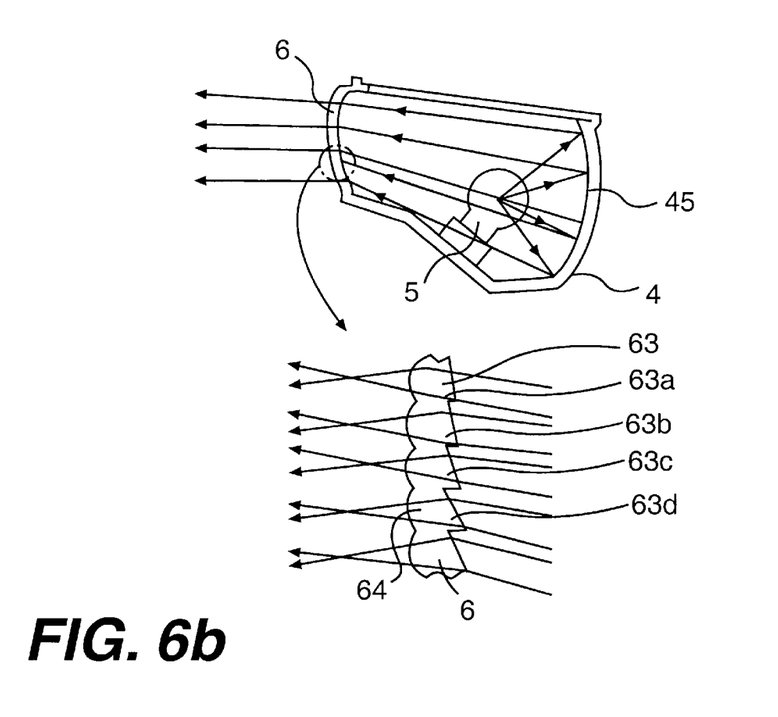

FIGS. 6A and 6B show light loci in the horizontal direction and in the vertical direction respectively of the HMSL thus constructed. Some parts of the light emitting from the bulb 5 forwardly run along respective optical axis, and ejects toward the rear side of the automobile. The other parts of the light run to the rear side of the lamp body 4, and are reflected by the reflector 45.

At this event, with respect to the horizontal direction, the light which is emitted from the bulb 5 and is reflected by the parabolic reflecting surface of the reflector 45 is directed substantially parallel. Then the reflected light is projected to the lens 6. On the other hand, with respect to the vertical direction, the optical axis is inclined front-up, and therefore, the reflected light reflected by the light-focusing surface of the reflector 45 is to be converged and projects to the lens 6 as a focused light which upward inclined. The focused light is directed downward by the refraction steps 63 formed inside the lens 6 when the focused light penetrates the lens 6, so that the optical axis of the light directs substantially in the horizontal direction. The light thus refracted is focused near the front of the lens 6 by the fisheye steps 64, and then, diverged in order to obtain the designated distribution characteristics.

As described above, in the HMSL 1, the light which emits from the bulb 5 and is reflected by the reflector 45 gets through the lens 6 while the light is focused with respect to the vertical direction. Therefore, even if the lens 6 has a small size in the vertical direction and the reflector 45 is larger in vertical size in comparison with the lens 6, the effective solid angle for the light emits from the bulb 5 can be designed sufficiently large. Consequently, the light efficiency can be improved, thereby comprising and the high brightness can be achieved.

In the above embodiment, the optical axis of the reflector 45 is inclined rear-down with respect to the lens 6, so that the top portion of the HMSL 1 can be flat. When the HMSL 1 is mounted on the rear parcel shelf RPS, a portion which protrudes from the upper surface of the rear parcel shelf RPS is reduced as possible. Accordingly, a driver receives little interruption for his back view field thereby.

Figure 7:
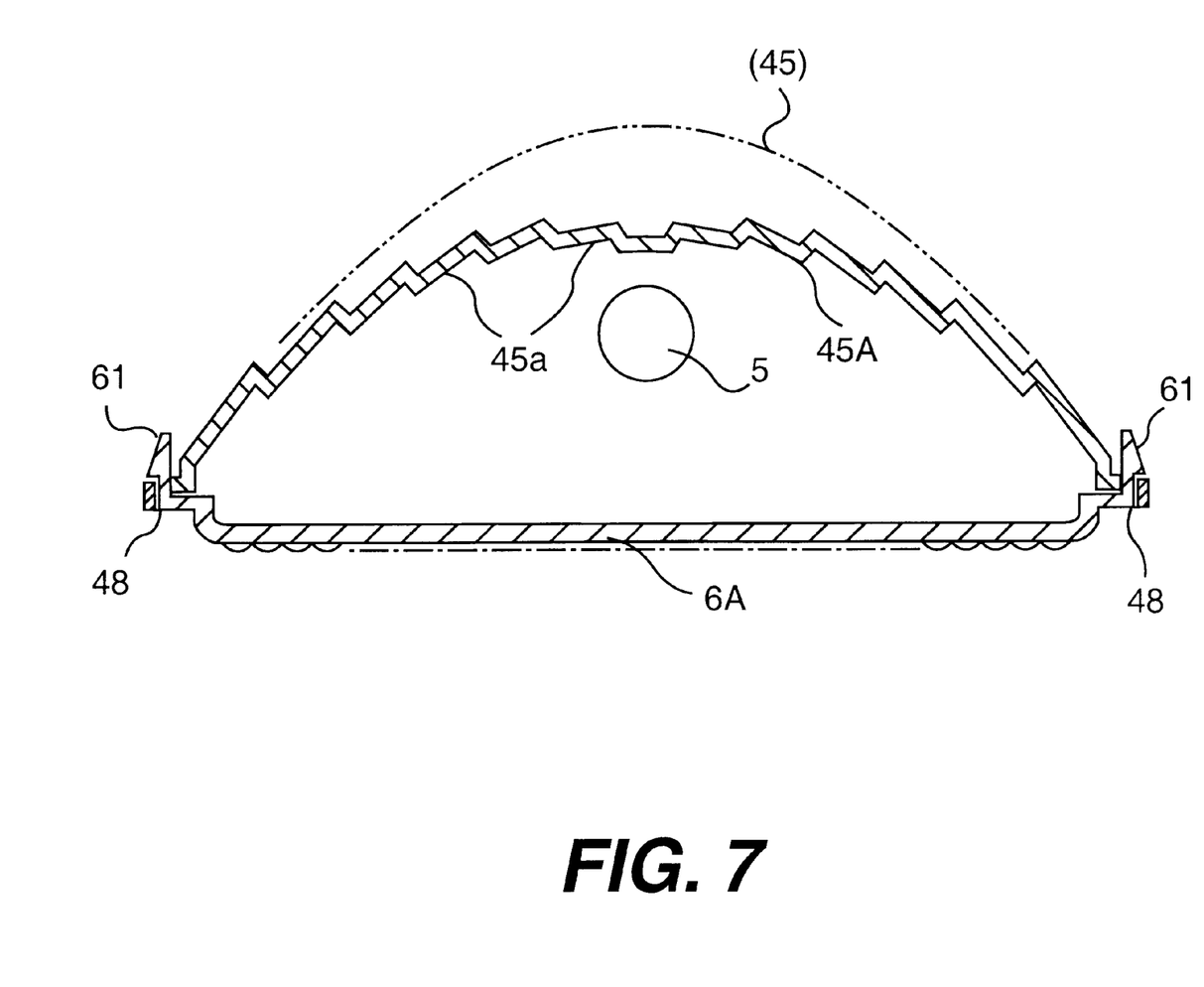
FIG. 7 is a cross sectional view showing a high-mount-stop-lamp cut out in the horizontal direction according to a second embodiment of the invention.
Figure 8:
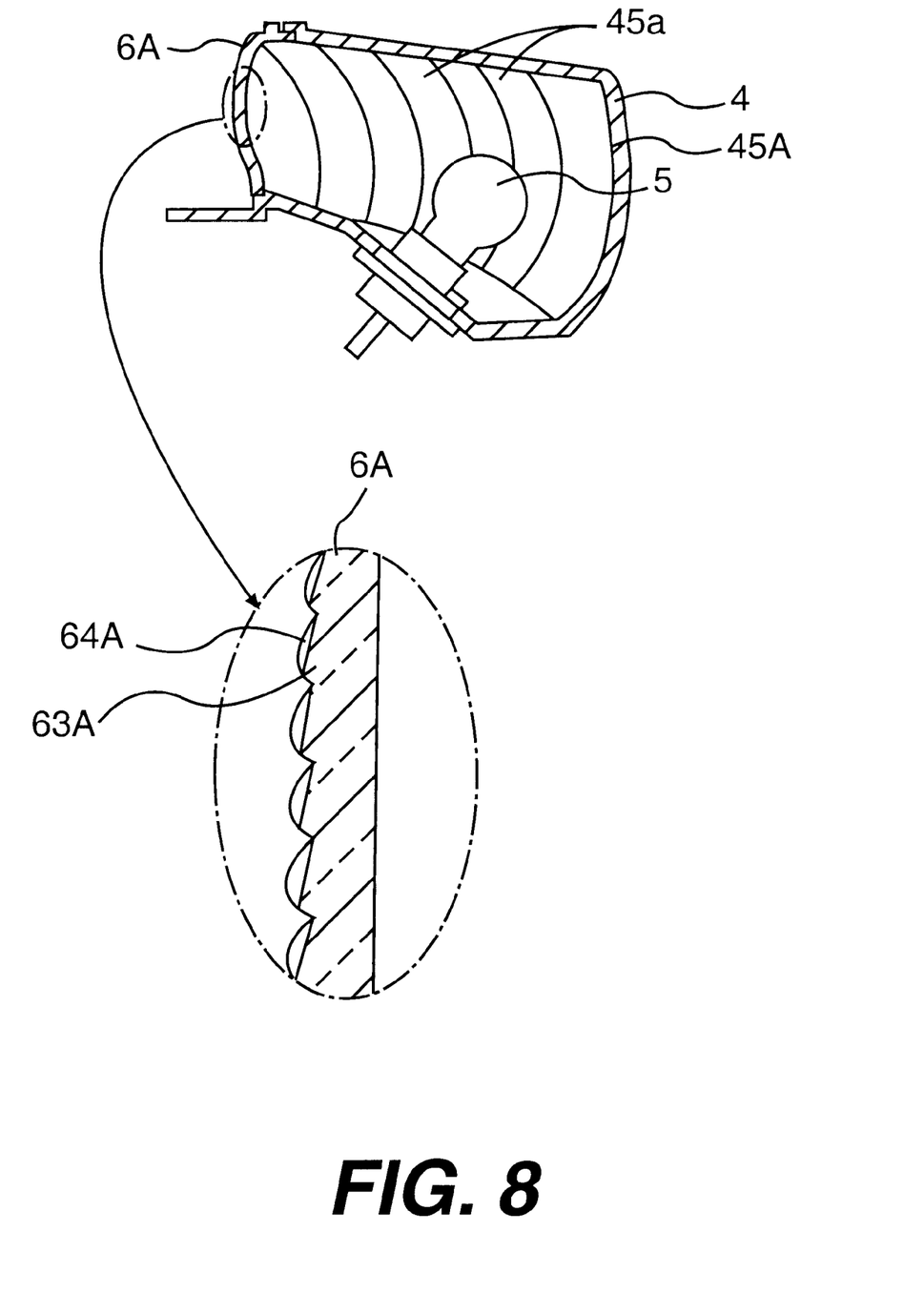
FIG. 8 is a cross sectional view showing the high-mount-stop-lamp cut out in the vertical direction.

FIG. 7 is a cross sectional view showing an assembled lamp unit cut out in the horizontal direction according to a second embodiment of the invention, and FIG. 8 is a cross sectional view thereof. The same parts and portions as the first embodiment have the same reference numerals in the second embodiment.

In the second embodiment, a reflector which is formed at the rear portion 42 of a lamp body 4 has a parabolic surface in horizontal direction and a light-focusing surface in vertical direction, similar to the first embodiment. Furthermore, the reflector 45A is provided such that the parabolic surface is divided into plural areas 45a with respect to the horizontal direction and each area near the center is closer to the filament (that is, the bulb 5) than respective outer area. Therefore, the reflector 45A can be relatively short in depth and the compact lamp body 4 can be obtained thereby.

The lens 6A, as the partial enlarged view shown in FIG. 8, has plural refraction steps 63A, each having a triangular shape in cross section and extending in the horizontal direction, and the refraction steps 63A are formed on the front surface side of the lens 6A and are arrayed in height direction. Similarly to the first embodiment, inclined surfaces of the refraction steps 63A face up, and the lower refraction step 63A has the larger angle inclined surface so as to refract the direct light from the bulb 5 and the reflected light from the reflector 45A and direct them substantially in the horizontal direction. On the surface of each refraction step 63A, fisheye steps 64A are arrayed like a checker board.

In the HMSL according to the second embodiment, the light beam which emits from the bulb 5 and is reflected by the reflector 45A projects to the lens 6A while the reflected light is focused in the vertical direction. Therefore, the larger reflector in vertical size in comparison with the lens 6 is available, and the effective solid angle for the light emits from the bulb 5 can be designed sufficient large. Consequently, the light efficiency can be improved and high brightness can be achieved.

Figure 9A:
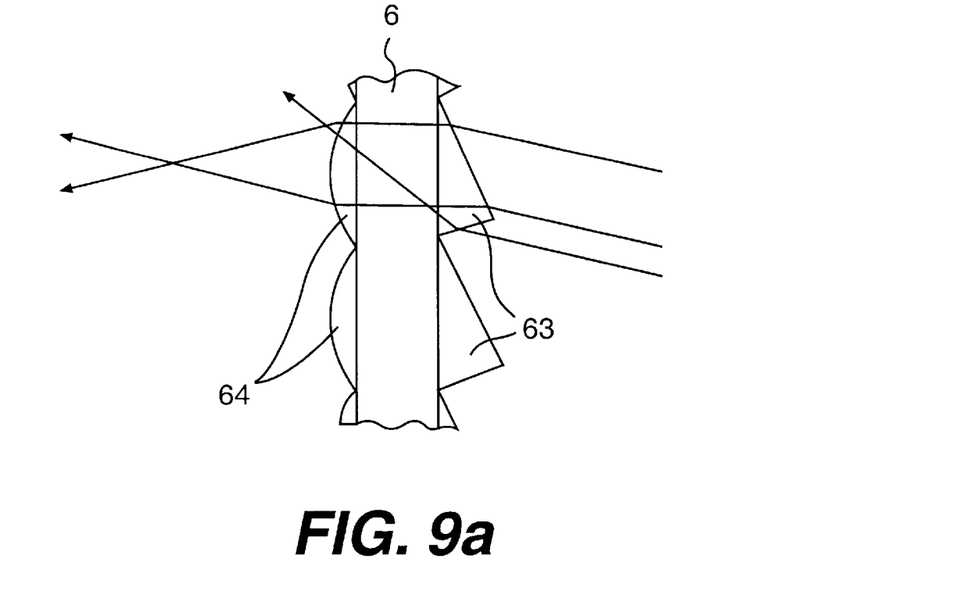
FIGS. 9A and 9B show light loci of the high-mount-stop-lamp according to the first and second embodiments of the invention.
Figure 9B:
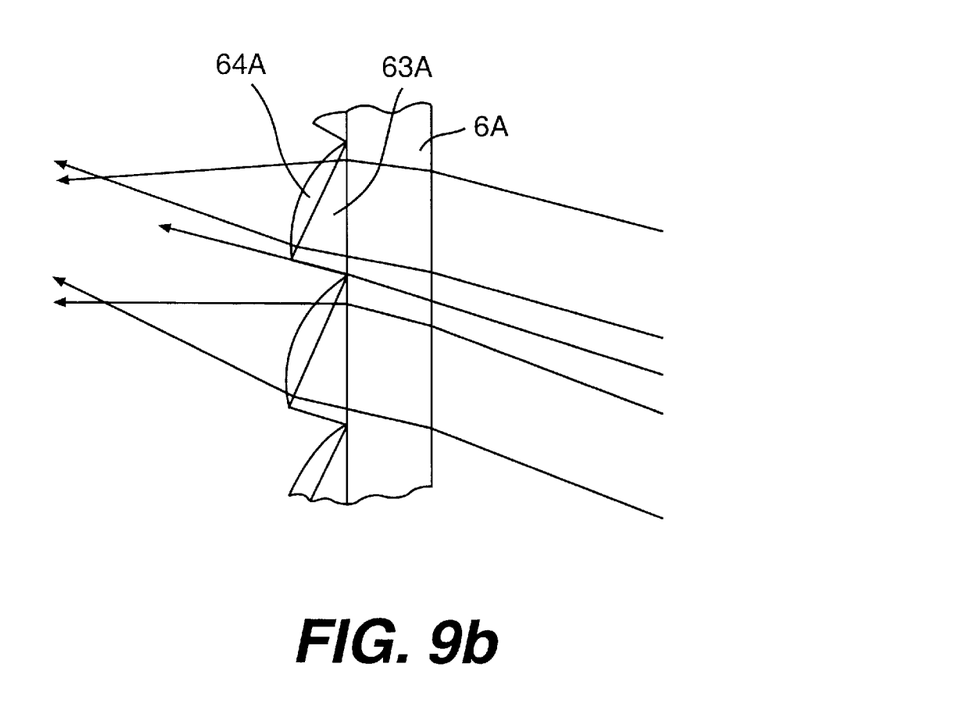

As shown in FIG. 9A, in case that the refraction steps 63 are formed inner surface of the lens 6 in the first embodiment, the light which projects at the lower inclined surface of the refraction step 63 may be refracted upwardly at the lens 6. On the contrary, the refraction steps 63A are formed outer surface of the lens 6A in the second embodiment. As shown in FIG. 9B, the lower inclined surface of the refraction step 63A is formed such that the inclined angle of the lower inclined surface accords to the direction of the refracted light refracted by the inner surface of the lens 6. Accordingly, all light beams passing through the lens 6A can be directed to the back side of the automobile, and consequently the light efficiency of the HMSL can be further improved.

Since each of the fisheye steps has a projecting shape and light-focusing characteristics, the light beams passing through the refraction step are not directed to the upper refractions steps. Therefore, the lights refracted by the refraction step and the upper refraction step thereof are not interfered.

The light which is reflected by the reflector 45 projects to the lens 6A as the parallel light with respect to the horizontal direction. In this case, because the reflector 45 is divided into the plural areas 45a, the light reflected is divided into strip shaped lights in the horizontal direction. Furthermore, the horizontally strip shaped lights are divided into strip shaped lights by the refraction steps 64A with respect to the vertical direction. Consequently, the light is divided and arranged like a checker board. And then, each divided light is focused on the front of the lens 6A by respective fisheye step, and diverged and ejects as the designated distribution light characteristic.

Similar to the first embodiment, the optical axis of the reflector 45A is inclined rear-down with respect to the lens 6A, so that the top portion of the HMSL 1 of the second embodiment can be flat. When the HMSL 1 is mounted on the rear parcel shelf RPS, a portion which protrudes from the upper surface of the rear parcel shelf RPS is reduced as possible. Accordingly, a driver receives little interruption for his back view field thereby. Furthermore, since the reflector 45A has plural areas in the horizontal direction so as to eccentric to the optical axis, the lamp body can be short in depth in relative to the first embodiment and the compact lamp body can be achieved thereby, as described above.

Figure 10:
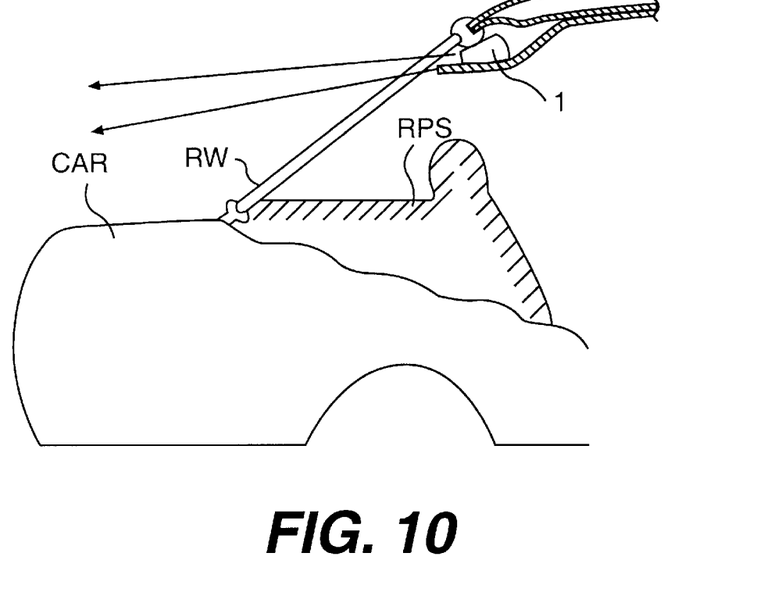
FIG. 10 shows a modification of the embodiments of the invention.

In the first and second embodiments of the invention described above, the HMSL is mounted on the rear parcel shelf. Alternatively, the HMSL may be attached to the upper peripheral portion of the rear window RW as shown in FIG. 10. In this case, the HMSL constructed according to the embodiments described above is attached upside down to the automobile. In the HMSL thus formed, not only a portion which downwardly protrudes is reduced as possible so as to keep the driver's back view field, but also the high brightness can be obtained.

According to the present invention, the reflector has a larger width than the lens, and the light from the light source is focused within the width of the lens. Therefore, the light from the light source can be projected with high efficiency, thereby achieving a lamp having a short width and high brightness. Furthermore, since the optical axis between the reflector and the light source is inclined with respect to the lens surface, the lamp in which the reflector does not project toward the lens can be formed. Still further, because the lens has the steps to refract the light on the optical axis, the designated light distribution characteristics can be obtained irrespective to the inclination of the optical axis.

What is claimed is:

1. A vehicular lamp, comprising:
   a light source;
   a reflector disposed to reflectively direct light emitted from the light source into a light beam in a direction substantially along an optical axis of the reflector; and
   a lens disposed to receive the light beam, the lens having saw-shaped refraction steps to refract the light beam and convex portions, each of the refraction steps having a corresponding convex portion, wherein the optical axis is inclined with respect to the lens.

2. The vehicular lamp according to claim 1, wherein the reflector has a larger vertical width than the lens, wherein the optical axis of the reflector is vertically inclined with respect to the lens, and wherein the refraction steps direct the light beam to a direction substantially perpendicular to the lens.

3. The vehicular lamp according to claim 2, wherein each one of the convex portions projects from the corresponding refraction step.

4. The vehicular lamp according to claim 3, wherein the refraction steps are formed on one of an inner surface and an outer surface of the lens, and the convex portions are formed on the outer surface of the lens.

5. The vehicular lamp according to claim 1, wherein the light source is disposed at a focal point of the reflector.

6. The vehicular lamp according to claim 1, wherein the refraction steps direct the light beam to a direction substantially perpendicular to a face of the lens.

7. The vehicular lamp according to claim 6, wherein the lens is disposed in a substantially vertical plane and the refraction steps direct the light beam to a substantially horizontal direction.

8. A vehicular lamp, comprising:
   a light source;
   a lamp body including a front opening, a rear portion having a reflector to reflect light emitted from the light source, a top portion, and a bottom portion having an insertion hole for receiving the light source, wherein the bottom portion is inclined such that the rear portion has a larger height than the front opening; and a lens disposed at the front opening of the lamp body, the lens including saw-shaped refraction steps and convex portions, each of the refraction steps having a corresponding convex portion.

9. The vehicular lamp according to claim 8, wherein each one of the convex portions projects from the corresponding one of the refractions steps.

10. The vehicular lamp according to claim 9, wherein the refraction steps are formed on one of an inner surface and an outer surface of the lens, and the convex portions are formed on the outer surface of the lens.

11. The vehicular lamp according to claim 8, wherein the reflector is divided into a plurality of areas with respect to a horizontal direction, and an area near the center of the reflector is closer to the light source than an outer area of the reflector.

12. The vehicular lamp according to claim 8, wherein the light source defines an attachment axis that is inclined with respect to the lens.

13. A vehicular lamp body, comprising:

a container including a front opening, a rear portion, a top portion and a bottom portion, wherein the rear portion has a reflector, wherein the bottom portion is inclined such that the container has a height that is larger at the rear portion than at the front opening; and a lens attached to the front opening of the container, the lens including saw-shaped refraction steps and the refraction steps having corresponding convex portions.

14. The vehicular lamp body according to claim 13, wherein each one of the convex portions projects from the corresponding one of the refractions steps.

15. The vehicular lamp body according to claim 14, wherein the refraction steps are formed on one of an inner surface and an outer surface of the lens, and wherein the convex portions are formed on the outer surface of the lens.

16. The vehicular lamp body according to claim 13, wherein the container defines a light source insertion hole for receiving the light source, wherein the reflector is divided into a plurality of areas with respect to a horizontal direction and wherein an area near the center of the reflector is closer to the light source than an outer area of the reflector.

17. A vehicular lamp, comprising:

a light source;

a reflector disposed to reflectively direct light emitted from the light source into a light beam in a direction substantially along an optical axis of the reflector; and a lens disposed to receive the light beam, the lens having saw-shaped refraction steps to refract the light beam and fisheye steps, each of the refraction steps having a corresponding fisheye step, wherein the optical axis is inclined with respect to the lens.

18. The vehicular lamp according to claim 17, wherein the refractions steps direct the light beam to a direction substantially perpendicular to the lens.

19. The vehicular lamp according to claim 17, wherein the refraction steps are formed on one of an inner surface and an outer surface of the lens, and the fisheye steps are formed on the outer surface of the lens.

20. A vehicular lamp, comprising:

a light source;

a reflector disposed to reflectively direct light emitted from the light source into a light beam in a direction substantially along an optical axis of the reflector; and a lens disposed to receive the light beam, the lens having refraction steps to refract the light beam to a light projecting direction, wherein the optical axis is inclined with respect to the light projecting direction.

21. The vehicular lamp according to claim 20, wherein the lens is disposed in a substantially vertical plane and the refraction steps direct the light beam to a direction substantially perpendicular to a face of the lens.

22. The vehicular lamp according to claim 20, wherein the refraction steps direct the light beam to a substantially horizontal direction.

23. The vehicular lamp according to claim 20, further comprising a plurality of convex portions disposed on the lens, wherein each of the refraction steps has a corresponding convex portion, and wherein the refraction steps are saw-shaped.

24. The vehicular lamp according to claim 23, wherein the refraction steps are formed on one of an inner surface and an outer surface of the lens, and the convex portions are formed on the outer surface of the lens.

* * * * *